Patented Mar. 22, 1938

2,111,762

UNITED STATES PATENT OFFICE 2,111,762

RESINOUS COMPOSITIONS FROM OXALIC ACID AND POLYHYDRIC ALCOHOLS AND PROCESS OF MAKING SAME

Carleton Ellis, Montclair, N. J., assignor to Ellis-Foster Company, a corporation of New Jersey No Drawing. Application January 6, 1936, Serial No. 57,851

6 Claims. (Cl. 260—8)

This invention relates particularly to synthetic resins or balsams produced by reacting a resinifying polyhydric alcohol such as the glycols, polyglycols, mannitol or mixtures of these with oxalic acid or mixtures of oxalic acid with one or more aromatic or aliphatic acids.

It is generally known that decomposition occurs on heating oxalic acid with glycerol and probably because of this precedent oxalic acid has not been employed in the past in the preparation of alkyd resins.

The present invention therefore comprehends the employment only or specifically of those polyhydric alcohols which are compatible, that is resin-forming. Thus by the use of such resinifying polyhydric alcohols various balsams, resins and the like as noted above may be made.

The resinous materials obtained by reacting glycols with oxalic acid alone, in general, have high acid numbers and dissolve in a limited number of solvents. However, products with very different properties may be had by replacing part of the oxalic acid and/or glycol in the original mix with other acids or alcohols. For example, many of these modified resins are soluble in a wide variety of materials such as acetone, cellosolve, butyl acetate, toluol, dioxan and tung oil. Depending upon the combination of constituents employed, products varying in consistency from viscous liquids to brittle solids are obtained.

These resins are for the most part miscible with other alkyd resins, cellulose acetate and nitrocellulose. The softer varieties may be used as plasticizers for coating, molding and adhesive compositions containing these and/or other materials with which the oxalic resins are compatible. The harder varieties, particularly those modified with rosin or other natural resins, are soluble in drying oils and yield varnishes.

Among the more common acidic bodies that may be employed with oxalic acid as modifying agents are monobasic acids such as cinnamic, benzoic and lactic, rosin and free fatty acids obtained from drying or non-drying oils; polybasic acids such as maleic, succinic, citric, tartaric and sebacic, phthalic anhydride and maleic adducts; and mixtures of these. The term "maleic adducts" as used here includes reaction products of bodies containing conjugated double bonds with other bodies, in general acidic, containing the group

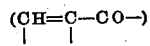

which is not a part of the benzene ring. Typical examples of such products are maleic adducts of tung and oiticica oils, of their fatty acids and of rosin.

The following examples illustrate the preparation of resinous materials and compositions therefrom to which this invention relates. All proportions are given as parts by weight.

*Example 1.*—126 parts ordinary hydrated oxalic acid and 62 parts ethylene glycol were heated at 150° C. under a short air condenser which permitted the escape of water vapor for 3 hours. The condenser was then removed and the materials were heated to 180° C. A yellowish somewhat viscous liquid soluble in acetone, cellosolve and dioxan, and having an acid number of 200 resulted.

*Example 2.*—A mixture of 126 parts ordinary hydrated oxalic acid and 150 parts triethylene glycol was slowly heated to 200° C., held at this temperature for about 2 hours and finally carried to 250° C. The product was a light reddish brown viscous liquid soluble in acetone and dioxan, and having an acid number of 210. The resinous material was miscible with other alkyd resins, cellulose acetate and nitrocellulose.

*Example 3.*—A mixture of 90 parts anhydrous oxalic acid and 105 parts diethylene glycol was heated slowly to 200° C., held at this temperature for 1½ hours and carried to 250° C. The product was a yellowish, very viscous liquid soluble in acetone and dioxan, and having an acid number of 330. The resinous material was compatible with other alkyd resins, cellulose acetate and nitrocellulose.

*Example 4.*—126 parts ordinary hydrated oxalic acid and 105 parts diethylene glycol were heated slowly to 200° C. and held at this temperature for about 2 hours. A straw-colored viscous liquid resulted which on further heating to 260° C. yielded a reddish-brown, semi-solid resinous mass having an acid number of about 300. The product was soluble in acetone and dioxan, and miscible with other alkyd resins, cellulose acetate and nitrocellulose.

*Example 5.*—A mixture of 126 parts ordinary hydrated oxalic acid, 302 parts rosin and 157 parts diethylene glycol was slowly heated to 200° C. and held at this temperature for 2 hours. The materials were then heated under a short air condenser at 250–280° C. for 1 hour. The product was a reddish-brown, fusible, brittle, resinous mass soluble in toluol, cellosolve, acetone and drying oils, and having an acid number of 40.

One part resin was heated with 1½ parts tung oil to 280° C. and held at this temperature for about 12 minutes until a thick varnish base formed. The base was dissolved in 2½ parts Varsol and 1% lead and cobalt naphthenates (based on oil) was added. The varnish dried rapidly to a clear, tough and hard film.

*Example 6.*—210 parts diethylene glycol, 116 parts maleic acid and 126 parts ordinary hydrated oxalic acid were heated slowly to 200° C. and held for about 2 hours at this temperature. A straw-colored, viscous liquid resulted which on further heating at 250° C. for ½ hour yielded a light reddish-brown, semi-solid resinous mass soluble in acetone, dioxan, and cellosolve. The resinous material was miscible with other alkyd resins, nitrocellulose and cellulose acetate.

*Example 7.*—A mixture of 210 parts diethylene glycol, 126 parts ordinary hydrated oxalic acid and 148 parts phthalic anhydride was heated at 200° C. for about 1½ hours and finally to 240° C. The product was a reddish-brown, semi-solid, fusible, resinous mass soluble in acetone, cellosolve, xylol, and dioxan, and having an acid number of 14. This material was firmer and of a darker color than that obtained in Example 1. The resin was miscible with other alkyd resins, cellulose acetate and nitrocellulose.

*Example 8.*—A mixture of 230 parts diethylene glycol, 148 parts phthalic anhydride, 126 parts ordinary hydrated oxalic acid and 24 parts maleic acid was heated slowly to 180° C. and held at 180–200° C. for 2 hours. The temperature was finally carried to 250° C. The product was a brownish, semi-solid, resinous mass of a much lighter shade than the material obtained in Example 5. It was soluble in butyl acetate, dioxan, acetone, cellosolve and xylol, and had an acid number of 130.

*Example 9.*—157 parts diethylene glycol, 126 parts ordinary hydrated oxalic acid and 125 parts tung acids-30-maleic (prepared by adding 30 parts maleic acid to 100 parts tung oil fatty acids at 160° C. and carrying the temperature to 280° C.) were heated slowly to 200° C. and held at this temperature for about 2 hours. The product was a very viscous, reddish-brown, stringy, resinous mass soluble in butyl acetate, acetone, xylol, cellosolve, and dioxan, and having an acid number of 167.

Lacquer prepared by dissolving 1 part resin and 1 part nitrocellulose in a mixture of 3 parts toluol and 3 parts butyl acetate gave clear, hard and tough films which adhered well to many materials, including tinned steel.

Another lacquer prepared by dissolving 1 part resin and 1 part cellulose acetate in 8 parts acetone gave clear flexible films which adhered well to rubber.

This product was also miscible with other alkyd resins.

*Example 10.*—A mixture of 100 parts tung-30-maleic (prepared by adding 30 parts maleic acid to 100 parts tung oil at 160° C. and carrying the temperature to 280° C.), 126 parts ordinary hydrated oxalic acid and 132 parts diethylene glycol was heated slowly to 180° C. and held at this temperature for 3 hours. The product was an amber-colored, very viscous, stringy mass soluble in acetone, cellosolve, butyl acetate, dioxan and xylol, and having an acid number of 149.

Lacquer prepared by dissolving 1 part of this resin and 1 part cellulose acetate in 8 parts acetone gave clear flexible films which adhered well to rubber.

The resin was also miscible with other alkyd resins and with nitrocellulose.

*Example 11.*—126 parts ordinary hydrated oxalic acid and 124 parts diethylene glycol were heated slowly to 150° C., 70 parts tung oil free acids were added and the mixture was heated at 180° C. for 4 hours. The product was a reddish-brown, viscous liquid soluble in xylol, cellosolve and acetone, and having an acid number of 154. Varnish prepared by dissolving 100 parts of this resin and 1 part lead and cobalt naphthenates in 200 parts xylol dried in about 1 day, but the films were rather soft.

*Example 12.*—A mixture of 126 parts ordinary hydrated oxalic acid, 75 parts rosin, 70 parts tung oil fatty acids and 135 parts diethylene glycol was heated slowly to 200° C. and held at 180–200° C. for 4 hours. The product was a reddish-brown, very viscous liquid soluble in acetone, cellosolve, butyl acetate and xylol, and having an acid number of 120.

The resinous material was miscible with other alkyl resins, rosin esters, cellulose acetate and nitrocellulose.

*Example 13.*—126 parts ordinary hydrated oxalic acid, 140 parts citric acid and 210 parts diethylene glycol were heated slowly to 180° C. and held at this temperature for 3 hours. The product was a slightly yellow, tough, stringy, semi-solid resinous mass soluble in acetone and dioxan, and insoluble in water. However an intermediate softer material removed after 2 hours heating dissolved in water.

*Example 14.*—A mixture of 105 parts diethylene glycol, 62 parts ethylene glycol and 254 parts ordinary hydrated oxalic acid was heated slowly to 180° C. and held at 160–180° C. for 1½ hours. The product was a yellowish viscous liquid soluble in acetone and cellosolve, and having an acid number of 280. This material was miscible with other alkyl resins, nitrocellulose and cellulose acetate.

*Example 15.*—67 parts pentaerythritol and 126 parts ordinary hydrated oxalic acid were heated at 150° C. for ¼ hour. A white spongy mass formed which became hard and brittle on cooling. The material dissolved slowly in hot water but was insoluble in acetone and cellosolve.

*Example 16.*—A mixture of 61 parts mannitol and 126 parts ordinary hydrated oxalic acid was heated slowly to 180° C. and held at this temperature for 1 hour. The product was a yellowish, soft, resinous solid soluble in water and in acetone, and having an acid number of 53.

*Example 17.*—105 parts diethylene glycol, 61 parts mannitol and 254 parts ordinary hydrated oxalic acid were heated at 130° C. for 2 hours and then at 180° C. for ½ hour. A yellowish, viscous liquid soluble in water and in acetone and having an acid number of 180 resulted.

*Example 18.*—A mixture of 150 parts triethylene glycol, 105 parts diethylene glycol, 126 parts ordinary hydrated oxalic acid and 116 parts maleic acid was heated slowly to 180° C. and held at this temperature for 2 hours.

The product was a reddish-brown, viscous liquid soluble in acetone and cellosolve, and having an acid number of 170. It was miscible with other alkyd resins, cellulose acetate and nitrocellulose.

In the accompanying examples proportions of acids to alcohols are substantially in the ratio of their chemical equivalents since, in general, more desirable products are obtained from such mixtures; however, these proportions may be varied to some extent without appreciably altering the properties of the products obtained. The ratio of individual acids in the acid component of the original mix is quite flexible and may be varied over wide limits.

In general, I prefer to carry out the resinification at temperatures as high as may be employed without excessive decomposition and volatilization of the constituents, although I may in some cases employ lower temperatures with correspondingly longer times of heating.

The examples illustrate types of acidic bodies that may be employed with oxalic acid in resinification with polyhydric alcohols and do not attempt to exhaust the possible variations.

Due to the oxalic acid component, these resinous bodies are regarded to be toxic to some animal life and thus may form a part of anti-fouling paints or other compositions where some resistance to certain plant and animal life is desired.

What I claim is:

1. An organic solvent soluble resinous composition compatible with cellulose acetate and with nitrocellulose, comprising the reaction product of diethylene glycol, oxalic acid and maleic adduct of tung oil.

2. The process of producing a synthetic resin soluble in organic solvents which comprises heating at reaction temperature a mixture of diethylene glycol, oxalic acid and maleic adduct of tung oil.

3. An organic solvent soluble resinous composition compatible with cellulose acetate and with nitrocellulose comprising the reaction product of a polyethylene glycol, oxalic acid and maleic adduct of tung oil.

4. An organic solvent soluble resinous composition compatible with cellulose acetate and with nitrocellulose comprising the reaction product of diethylene glycol, oxalic acid and maleic adduct of tung oil acids.

5. The process of making a synthetic resin which comprises heating at reaction temperature a mixture of a polyethylene glycol, oxalic acid and maleic adduct of tung oil.

6. The process of making a synthetic resin which comprises heating at reaction temperature a mixture of diethylene glycol, oxalic acid and maleic adduct of tung oil acids.

CARLETON ELLIS.